United States Patent [19]
Chuang

[11] Patent Number: 5,908,984
[45] Date of Patent: Jun. 1, 1999

[54] TIRE PRESSURE GAUGE

[76] Inventor: Louis Chuang, P.O. Box 63-247, Taichung, Taiwan

[21] Appl. No.: 09/124,777

[22] Filed: Jul. 30, 1998

[51] Int. Cl.$^6$ .................................................. B60C 23/02
[52] U.S. Cl. ............................................................ 73/146.3
[58] Field of Search ................................ 73/146.3, 146.8

[56] References Cited

U.S. PATENT DOCUMENTS

| | | | |
|---|---|---|---|
| 4,998,438 | 3/1991 | Martin | 73/146.8 |
| 5,606,123 | 2/1997 | Rabizadeh | 73/146.8 |

*Primary Examiner*—William Oen
*Attorney, Agent, or Firm*—Charles E. Baxley, Esq.

[57] ABSTRACT

A tire pressure gauge includes a first portion having a display mounted thereto for displaying pressure value of a tire to be inspected and a second portion having a compartment defined therein and communicated with the display. The second portion may receive a valve of a tire to be inspected. The second portion further includes a slot defined in a periphery thereof and communicated with the compartment. A switch member is pivotally mounted in the compartment of the second portion and includes an operative member extended beyond the slot for manual operation. The operative member is movable between a first position for inspecting a first type of tire valves and a second position for inspecting a second type of tire valves along the slot of the second portion.

12 Claims, 6 Drawing Sheets

TIRE PRESSURE GAUGE

BACKGROUND OF THE INVENTION

1. Field of the Invention

The present invention relates to a tire pressure gauge that can be used to inspect tire pressure of two different types of valves for tires.

2. Description of the Related Art

Currently there are at least two types of valves for all kinds of tires, e.g., American type and French type, yet all of the commercially available tire pressure gauges can be used on only one of them. The present invention is intended to provide an improved tire pressure gauge to solve this problem.

SUMMARY OF THE INVENTION

It is a primary object of the present invention to provide an improved tire pressure gauge that can be used to inspect the tire pressure of tires with either American valve or French valve.

A tire pressure gauge in accordance with the present invention comprises:

a first portion including a display means mounted thereto for displaying pressure value of a tire adapted to be inspected by the tire pressure gauge, a second portion including a compartment defined therein and communicated with the display means, the second portion further including a slot defined in a periphery thereof and communicated with the compartment, a switch member pivotally mounted in the compartment of the second portion and including an operative member extended beyond the slot for manual operation, the operative member being movable between a first position for inspecting a first type of tire valves and a second position for inspecting a second type of tire valves along the slot of the second portion, a retainer including a first end engaged with the switch member to rotate therewith and a second end with a first chamber defined therein, the retainer further including a transverse hole communicated with the first chamber, a sleeve securely mounted in the compartment, the sleeve including a second chamber defined in a first end thereof for rotatably receiving the second end of the retainer and a third chamber defined in a second end thereof, the sleeve further including a first passage communicated with the second chamber and the first chamber such that the first chamber of the retainer communicates the display means via the transverse hole of the retainer and the first passage of the sleeve, and a needle member slidably received in the sleeve and including a first end and a second end, the needle member including a second passage communicated outside with the first chamber of the retainer, whereby when the switch member is in the first position, the first end of the needle member bears against the second end of the retainer for inspecting said first type of tire valves, and when the switch member is in the second position, the first end of the needle is insertable into the first chamber of the second end of the retainer for inspecting the second type of tire valves.

A spring is mounted in the sleeve for biasing the needle member away from the retainer. The spring includes a first end attached to an end wall that defines the first chamber of the retainer and a second end attached to the needle member. The first end of the needle member includes a receptacle defined therein, and the second end of the spring is attached to a second end wall that defines the receptacle.

The sleeve includes an annular groove defined in an outer periphery thereof, and the second portion further includes a flange defined in an inner periphery thereof and securely received in the annular groove.

The retainer may include an annular groove defined in an outer periphery thereof for receiving an O-ring.8. The first chamber of the second end of the retainer is elongated. In addition, the first end of the retainer includes a flat key securely engaged with the switch member to rotate therewith. A washer may be mounted around the first end of the retainer for rotatably holding the first end of the retainer.

A plastic valve holder may be securely mounted in the third chamber of the sleeve for holding a valve of a tire to be inspected.

The tire pressure gauge may further comprise a mediate portion provided between the first portion and the second portion for grasp. The mediate portion includes a plurality of recesses defined in an outer periphery thereof for easy grasp.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
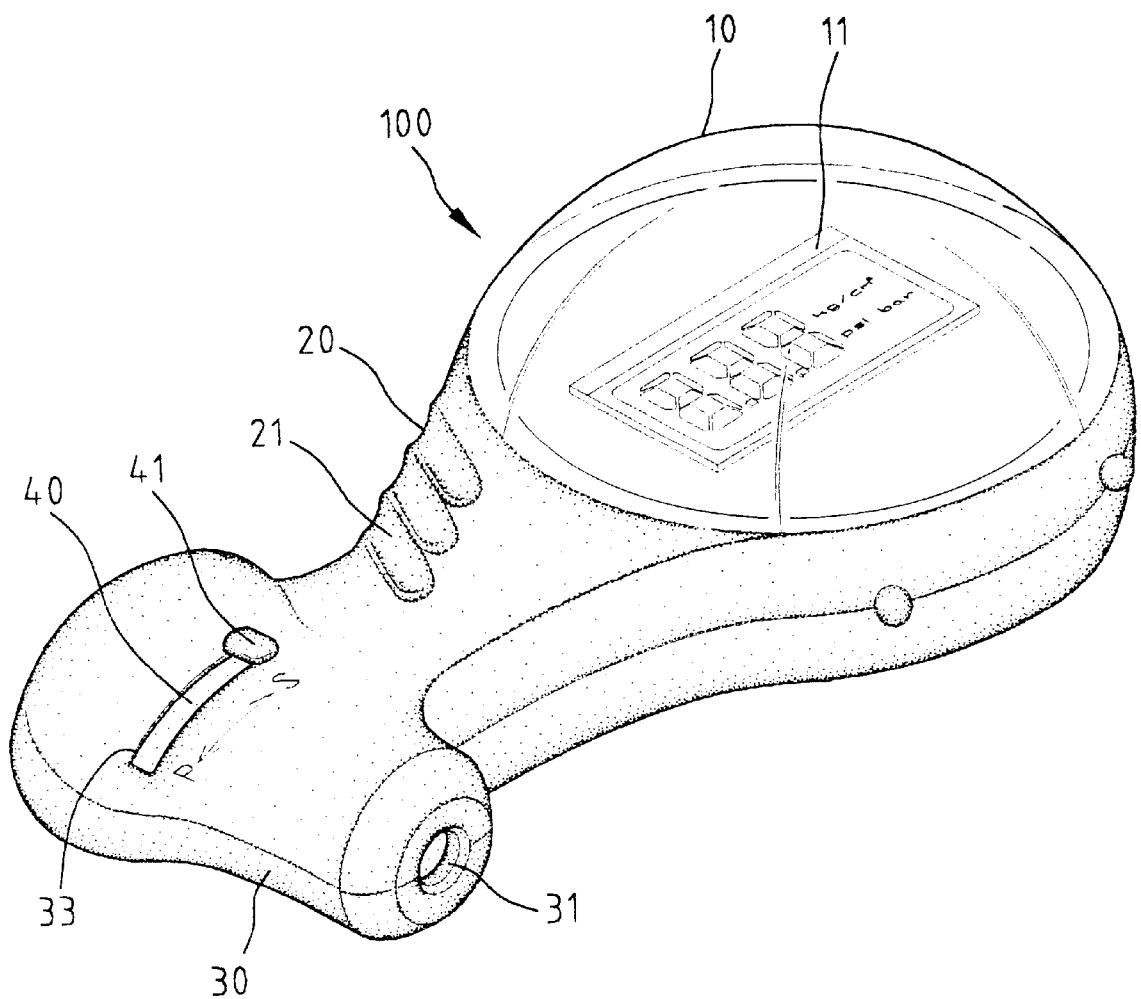
FIG. 1 is a perspective view of a tire pressure gauge in accordance with the present invention.
Figure 2:
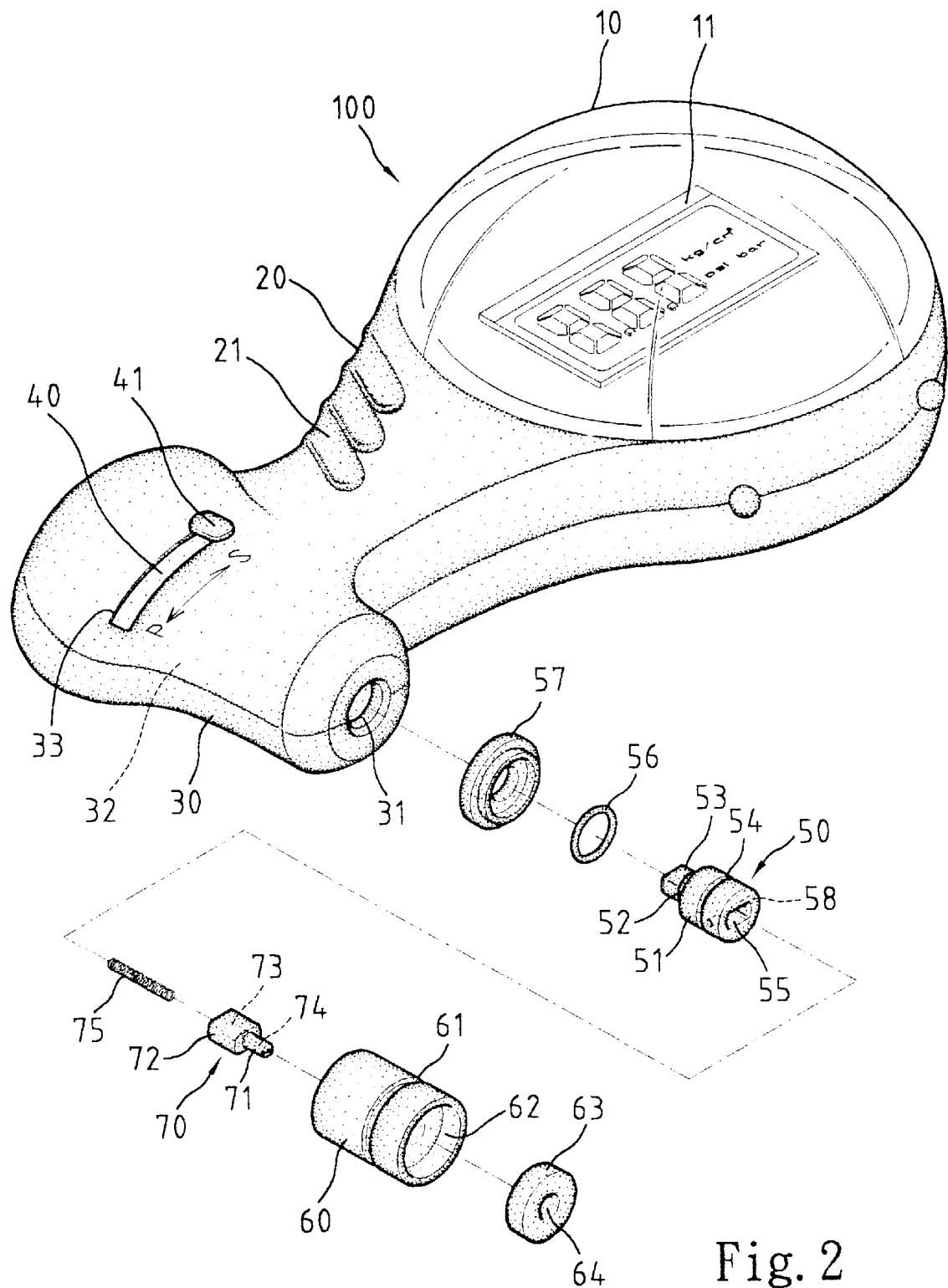
FIG. 2 is an exploded view of the tire pressure gauge.

Referring to the drawings and initially to FIGS. 1 and 2, a tire pressure gauge in accordance with the present invention is designated by reference numeral "100" and generally includes a first portion 10, a second portion 30, and a mediate portion 20 connected between the first and second portions 10 and 30. The first portion 10 includes a display means 11 mounted thereto for displaying tire pressure of the tire to be inspected. The mediate portion 20 includes a channel 22 (FIG. 3) that is communicated between the second portion 30 and the display means 11. The mediate portion 20 may include a number of recesses 21 defined in an outer periphery thereof for grasp.

Figure 3:
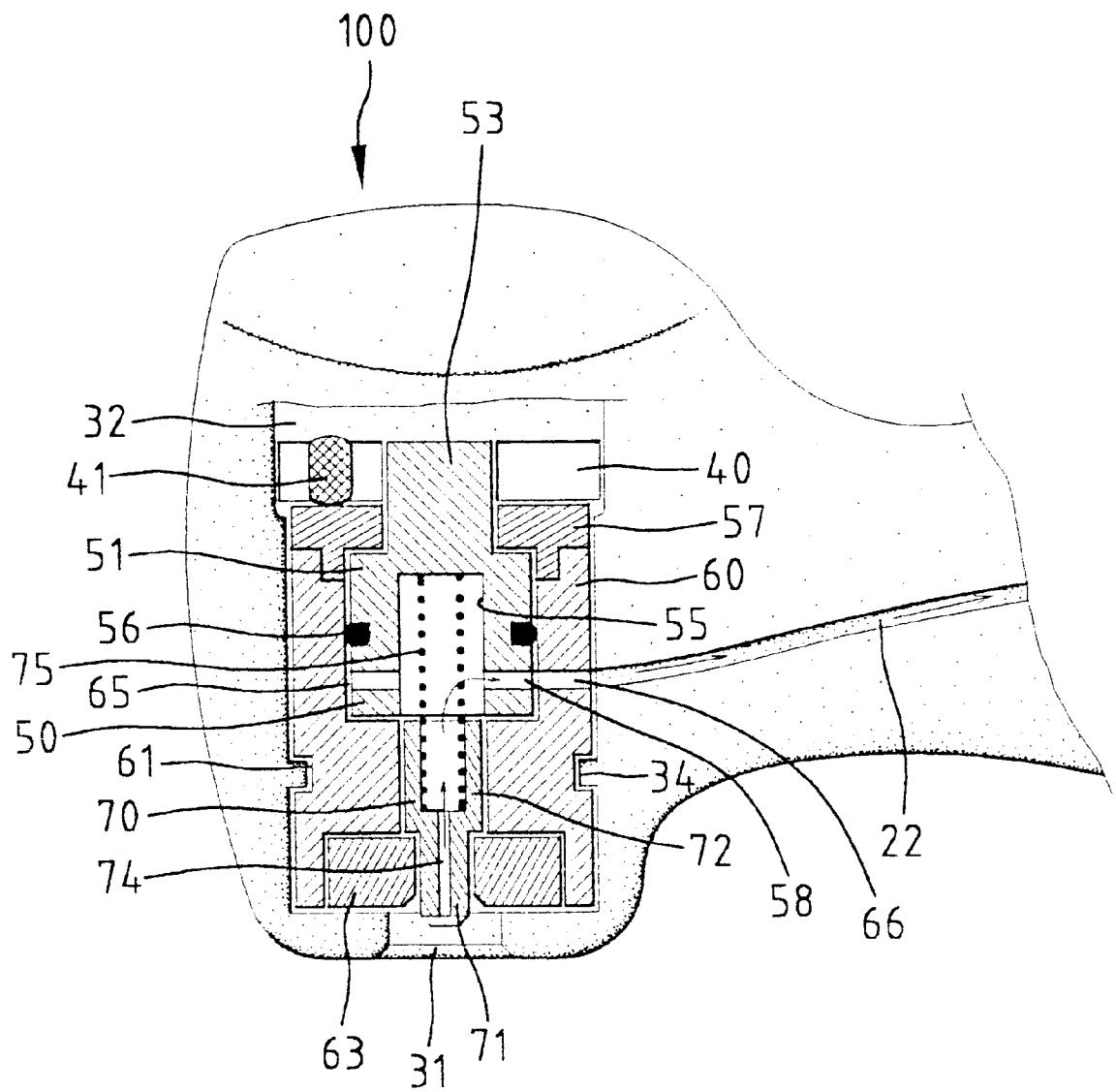
FIG. 3 is a partial sectional view of a front portion of the tire pressure gauge, illustrating arrangement of the air passage.

As shown in FIG. 3, the second portion 30 is substantially L shaped and includes a compartment 32 defined therein and communicated with the channel 22 in the mediate portion 20. The second portion 30 further includes a slot 33 (FIG. 1) defined in a periphery thereof and communicated with the compartment 32. A switch member 40 is pivotally received in the compartment 32 and includes an operative member 41 extended beyond the slot 33 for manual operation between a first position (indicated by "S", FIG. 1) and a second position (indicated by "P"), which will be further described later. The second portion 30 further includes an insert hole 31 through which a valve of a tire can be inserted for inspecting pressure of the tire.

Referring to FIGS. 2 and 3, a sleeve 60 is securely received in the compartment 32 by means of engagement between an annular groove 61 defined in an outer periphery of the sleeve 60 and a flange 34 formed on an inner periphery of the second portion 30. A retainer 50 is received in a first chamber 65 defined in a first end of the sleeve 60. The retainer 50 includes a first end 52 with a flat key 53 securely engaged with the switch member 40 to rotate therewith and a second end having an elongated chamber 55 defined therein. The sleeve 60 further includes a second chamber 62 defined in a second end thereof, which will be described later. An annular groove 54 is defined in a mediate section 51 of the retainer 50 for receiving an O-ring 56. In addition, the second end of the retainer 55 includes a transverse hole 58 that communicates the chamber 55 with the channel 22 via a passage 66 defined in the sleeve 60, best shown in FIG. 3. A washer 57 may be mounted to the first end 52 of the retainer 50 to support the flat key 53.

A needle member 70 includes a first end 72 received in the sleeve 60 and a reduced second end 71 (in the form of a needle) received in the second chamber 62 of the sleeve 60. The first end 72 of the needle member 70 includes a receptacle 73 defined therein for receiving a portion of a spring 75, and the second end 71 of the needle member 70 includes a passage 74 that communicates outside with the receptacle 73, which, in turn, is communicated with the chamber 55 of the retainer 50. As shown in FIG. 3, the spring 75 includes a first end attached to an end wall defining the chamber 55 of the retainer 50 and a second end attached to an end wall defining the receptacle 73 for biasing the needle member 70 away from the retainer 50. A valve holder 63, preferably made of plastic material, is securely received in the chamber 62 of the sleeve 60 and includes a hole 64 for receiving the second end 71 of the needle member 70.

Figure 4:
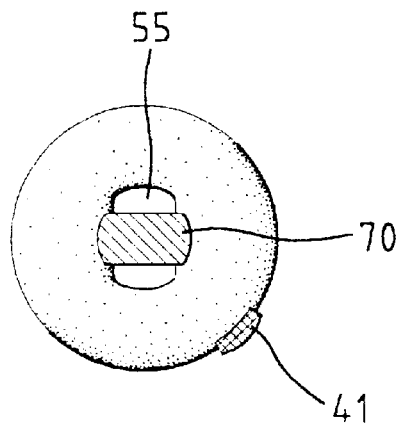
FIG. 4 is a schematic sectional view illustrating status of a retainer of the tire pressure gauge for inspecting pressure of a tire with an American valve.
Figure 5:
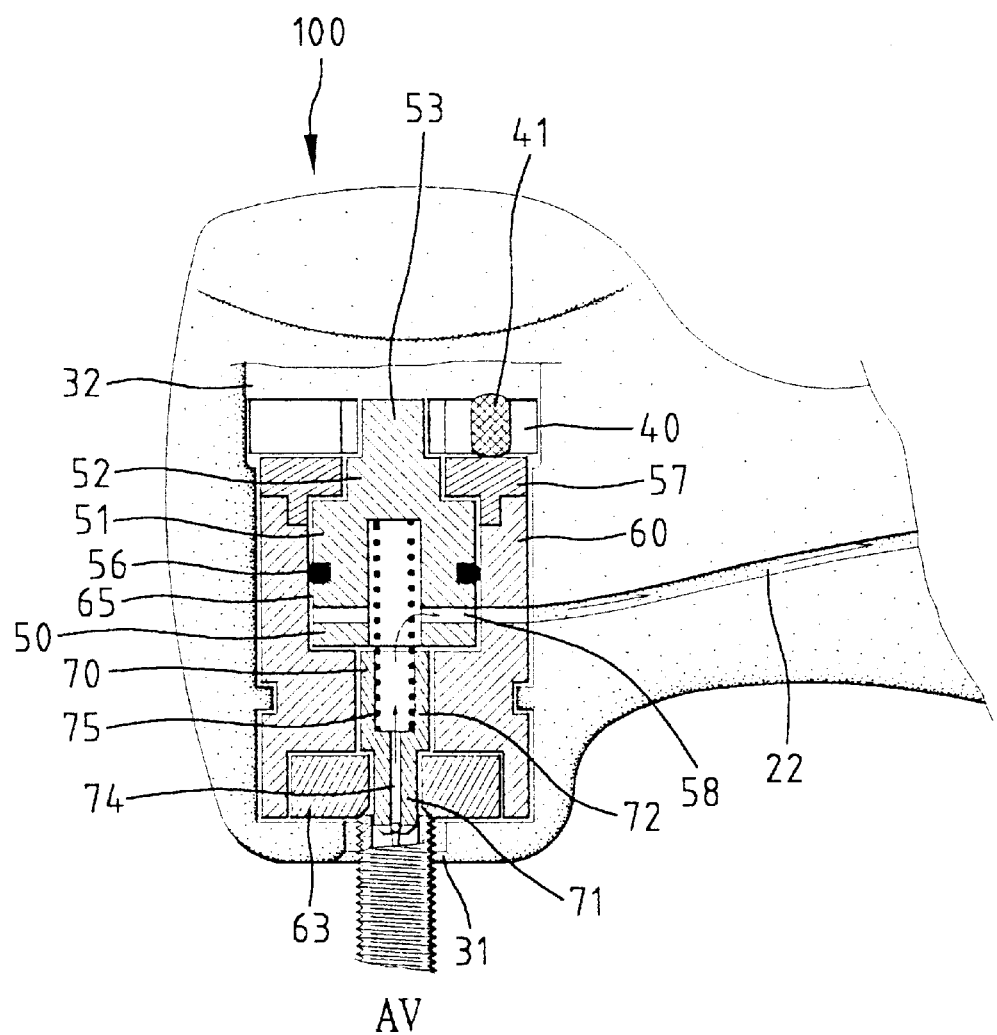
FIG. 5 is a partial sectional view illustrating inspection of pressure of the tire with the American valve.
Figure 6:
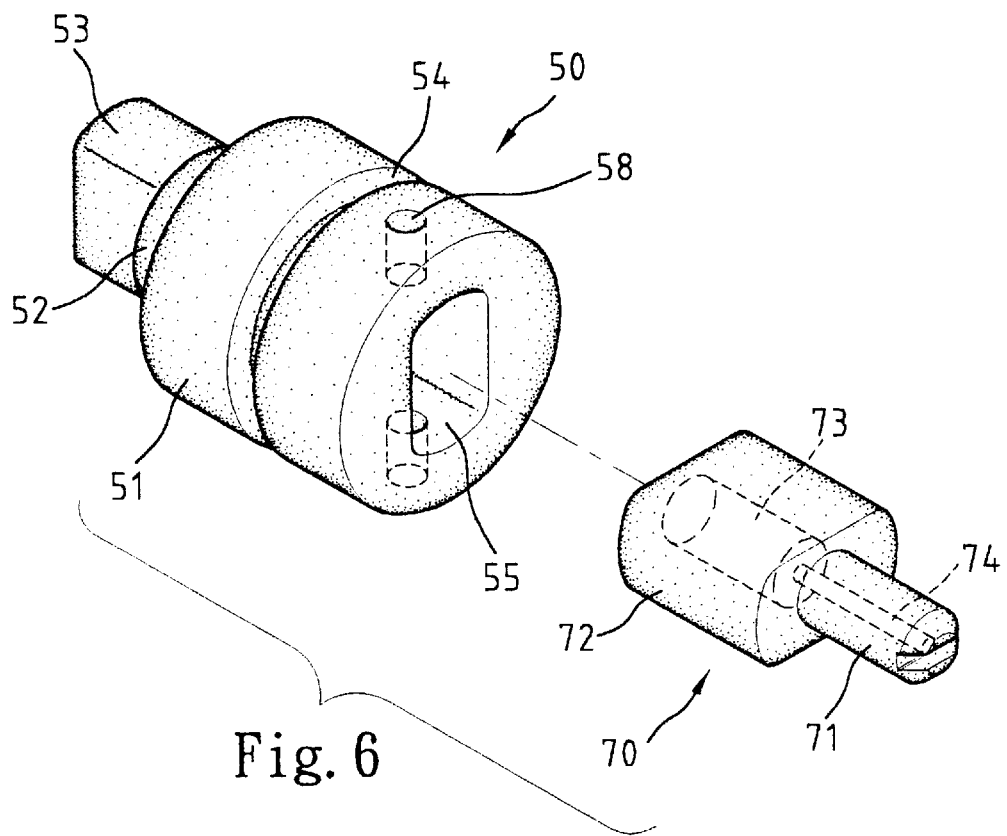
FIG. 6 is an exploded view illustrating engaging relationship between the retainer and a needle member of the tire pressure gauge in the status for inspecting pressure of the tire with the American valve.

When inspecting pressure of a tire (not shown) with an American valve, the operative member 41 of switch member 40 is switched to the first position (point "S" in FIG. 1) such that, as shown in FIGS. 4, 5, and 6, the needle member 70 bears against the second end of the retainer 50. As shown in FIG. 5, the second portion 30 of the tire pressure gauge 100 is directly applied to the American valve AV such that the American valve AV is extended into the passage 74 of the needle member 70 via the insert hole 31 of the second portion 30. The plastic valve holder 63 holds the American valve AV. Thus, air inside the tire enters the passage 74 and flows to the channel 22 via the receptacle 73, the chamber 55, and the transverse hole 58. Accordingly, the user may read the pressure value of the pressure of the tire via the display means 11.

Figure 9:
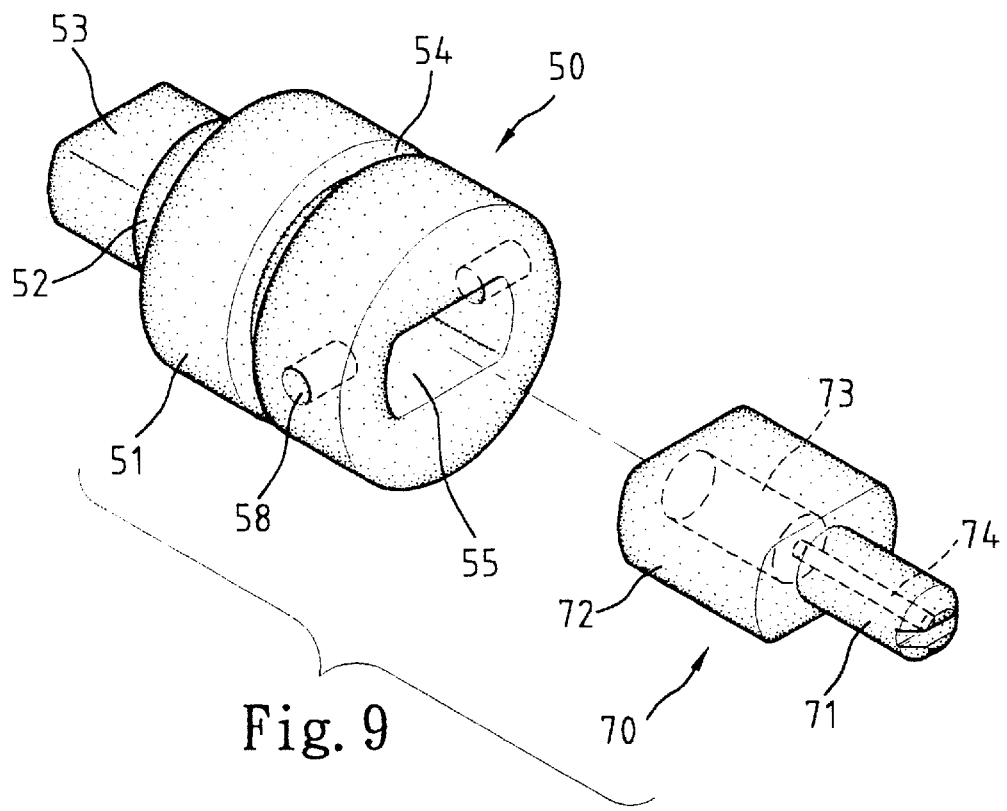
FIG. 9 is an exploded view illustrating engaging relationship between the retainer and the needle member of the tire pressure gauge in the status for inspecting pressure of a tire with the French valve.
Figure 7:
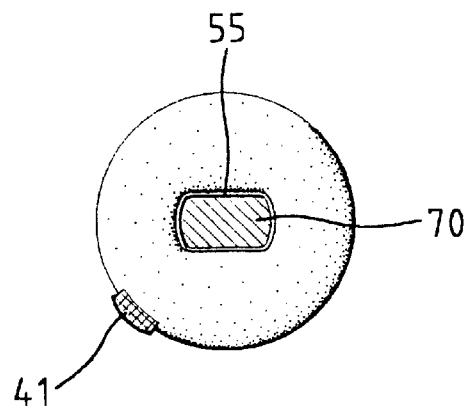
FIG. 7 is a schematic sectional view illustrating status of the retainer of the tire pressure gauge for inspecting pressure of a tire with a French valve.
Figure 8:
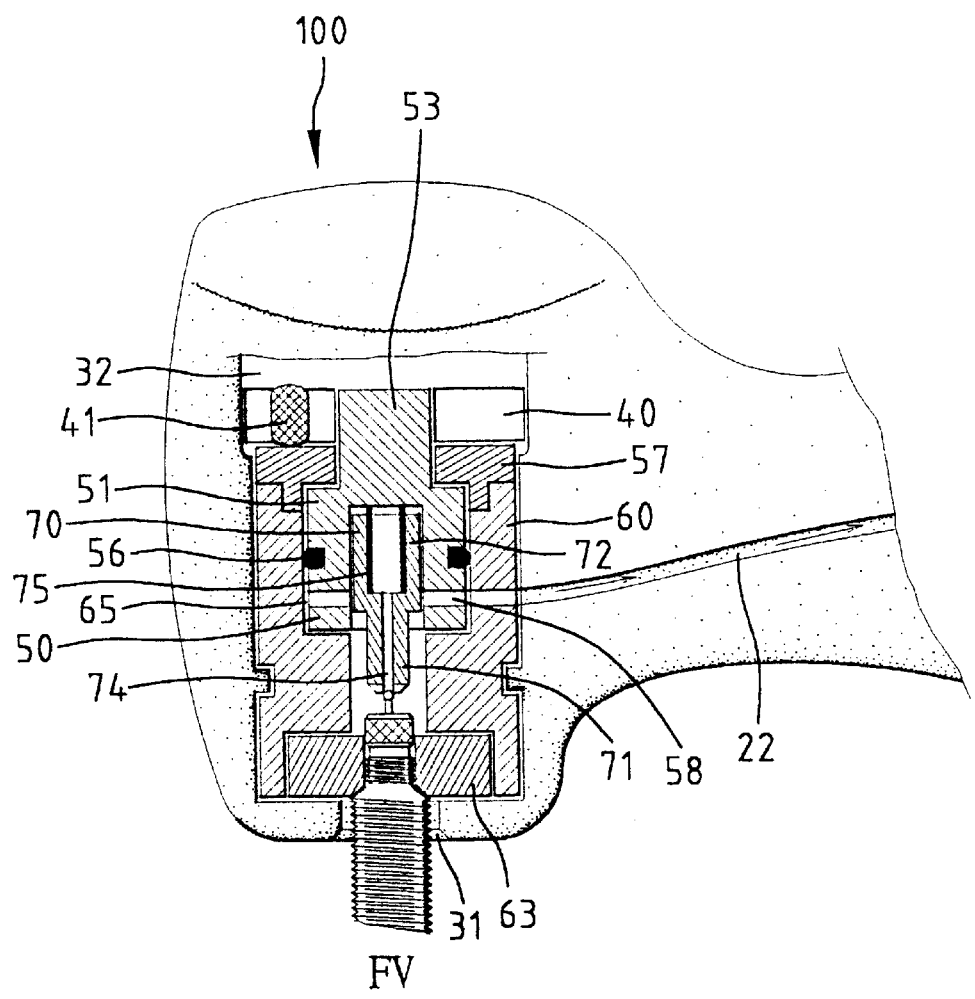
FIG. 8 is a partial sectional view illustrating inspection of pressure of a tire with the French valve.

When inspecting pressure of a tire with a French valve, the operative member 41 of switch member 40 is switched to the second position (point "P" in FIG. 1) such that, as shown in FIGS. 7, 8, and 9, the needle member 70 is insertable into the chamber 55 of the second end of the retainer 50. As shown in FIG. 8, the second portion 30 of the tire pressure gauge 100 is directly applied to the French valve FV such that the French valve FV is extended into the insert hole 31 of the second portion 30 and pushes the first end 72 of the needle member 70 into the chamber 55 of the retainer 50. The plastic valve holder 63 holds the French valve FV. Thus, air inside the tire enters the passage 74 and flows to the channel 22 via the receptacle 73, the chamber 55, and the transverse hole 58. Accordingly, the user may read the pressure value of the pressure of the tire via the display means 11.

According to the above description, it is appreciated that the tire pressure gauge of the present invention can be used on tires with either American valve or French valve upon simple operation on the switch member 40. The tires may be tires for all kinds of vehicles, e.g., bicycles, motorcycles, automobiles, etc.

Although the invention has been explained in relation to its preferred embodiment, it is to be understood that many other possible modifications and variations can be made without departing from the spirit and scope of the invention as hereinafter claimed.

What is claimed is:

1. A tire pressure gauge, comprising:

a first portion including a display means mounted thereto for displaying pressure value of a tire adapted to be inspected by the tire pressure gauge, a second portion including a compartment defined therein and communicated with the display means, the second portion further including a slot defined in a periphery thereof and communicated with the compartment, a switch member pivotally mounted in the compartment of the second portion and including an operative member extended beyond the slot for manual operation, the operative member being movable between a first position for inspecting a first type of tire valves and a second position for inspecting a second type of tire valves along the slot of the second portion, a retainer including a first end engaged with the switch member to rotate therewith and a second end with a first chamber defined therein, the retainer further including a transverse hole communicated with the first chamber, a sleeve securely mounted in the compartment, the sleeve including a second chamber defined in a first end thereof for rotatably receiving the second end of the retainer and a third chamber defined in a second end thereof, the sleeve further including a first passage communicated with the second chamber and the first chamber such that the first chamber of the retainer communicates the display means via the transverse hole of the retainer and the first passage of the sleeve, and a needle member slidably received in the sleeve and including a first end and a second end, the needle member including a second passage communicated outside with the first chamber of the retainer, whereby when the switch member is in the first position, the first end of the needle member bears against the second end of the retainer for inspecting said first type of tire valves, and when the switch member is in the second position, the first end of the needle is insertable into the first chamber of the second end of the retainer for inspecting the second type of tire valves.

2. The tire pressure gauge according to claim 1, further comprising a spring mounted in the sleeve for biasing the needle member away from the retainer.

3. The tire pressure gauge according to claim 2, wherein the spring includes a first end attached to an end wall that defines the first chamber of the retainer and a second end attached to the needle member.

4. The tire pressure gauge according to claim 3, wherein the first end of the needle member includes a receptacle defined therein, and the second end of the spring is attached to a second end wall that defines the receptacle.

5. The tire pressure gauge according to claim 1, wherein the sleeve further includes an annular groove defined in an outer periphery thereof, and the second portion further includes a flange defined in an inner periphery thereof and securely received in the annular groove.

6. The tire pressure gauge according to claim 1, wherein the retainer further includes an annular groove defined in an outer periphery thereof for receiving an O-ring.

7. The tire pressure gauge according to claim 1, further comprising a plastic valve holder securely mounted in the third chamber of the sleeve, the plastic valve holder being adapted to hold a valve of a tire to be inspected.

8. The tire pressure gauge according to claim 1, wherein the first chamber of the second end of the retainer is elongated.

9. The tire pressure gauge according to claim 1, wherein the first end of the retainer includes a flat key securely engaged with the switch member to rotate therewith.

10. The tire pressure gauge according to claim 1, further comprising a washer mounted around the first end of the retainer for rotatably holding the first end of the retainer.

11. The tire pressure gauge according to claim 1, further comprising a mediate portion provided between the first portion and the second portion for grasp.

12. The tire pressure gauge according to claim 11, wherein the mediate portion includes a plurality of recesses defined in an outer periphery thereof for grasp.

* * * * *